Dec. 1, 1964 F. D. JOESTING 3,159,208

FLUID FLOW CONTROL DEVICE

Filed March 23, 1961 2 Sheets-Sheet 1

INVENTOR.
FREDERICK D. JOESTING
BY Alfred N. Feldman
ATTORNEY

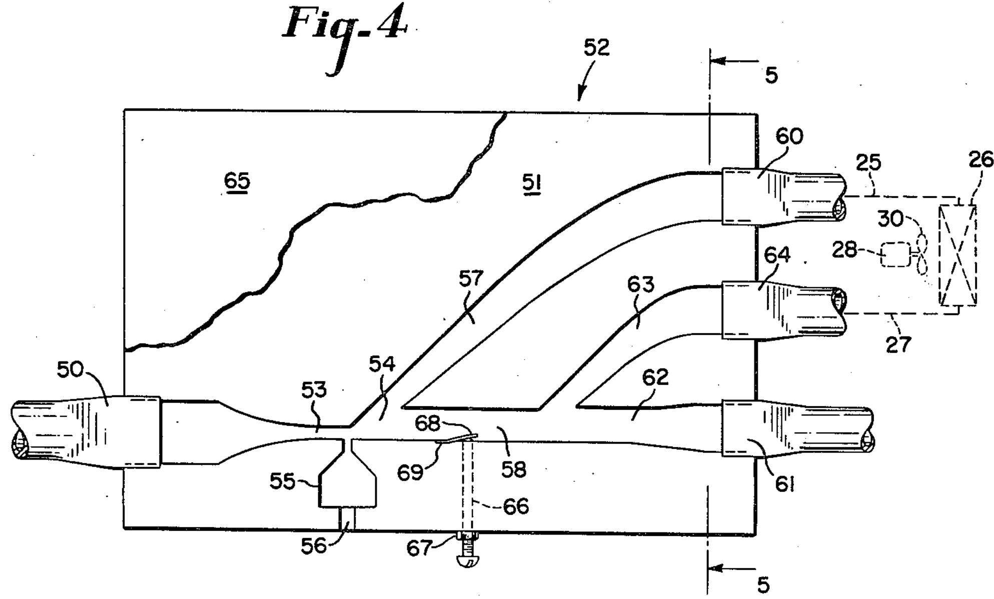
Fig-4
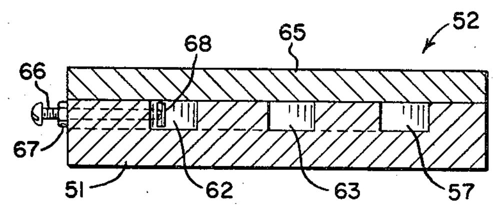
Fig-5
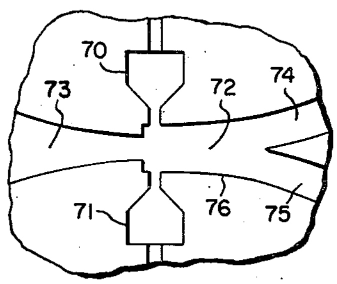
Fig-6
80 81 82 86 85 87 84 83
Fig-7
INVENTOR.
FREDERICK D. JOESTING
BY Alfred N. Feldman
ATTORNEY United States Patent Office 3,159,208 Patented Dec. 1, 1964

3,159,208

FLUID FLOW CONTROL DEVICE

Frederick D. Joesting, Park Ridge, Ill., assignor to Honeywell Inc., a corporation of Delaware Filed Mar. 23, 1961, Ser. No. 97,872
10 Claims. (Cl. 165—1)

The present invention is directed to a flow control device for use in a temperature control or an air conditioning system, and more specifically is directed to a fluid switching unit that is capable of directing flow through a heat exchange coil or bypassing the flow around the coil. In the presently disclosed device, there are no moving parts and the entire switching function is accomplished by a unique configuration of fluid amplifier.

A group of men working for the United States Army Ordnance Corps at the Diamond Ordnance Fuze Laboratory, have invented a unique type of fluid amplifier that is capable of switching a fluid flow between two fluid flow passages by means of pressure jets directed at the sides of the flowing fluid. An article describing this type of fluid amplifier appears in the publication Control Engineering for May 1960, on pages 26, 28, and 30. This article is entitled "Fluid Computing Elements Open New Doors In Control." This type of fluid amplifier operates on the principle of deflecting the flow of a moving fluid from one channel or passage to another channel by causing a control jet or fluid to impinge on the side of the flowing fluid. This action causes the flowing fluid to shift position into the second flow passage and remain in that passage due to a pressure differential that develops by the flow of fluid along the wall of the channel. The fluid can be caused to reverse or switch back to its original flow course by applying a pressure force to the opposite side of the unit. This type of fluid amplifier is becoming well known in the literature and there have been numerous articles written directed to the theories of its operation and to various configurations in which it may be found.

Since the above referenced fluid amplifier contains no moving parts and has no check valves or structures that prevent reverse flow in the unit, it is difficult, if not impossible, to apply this type of a fluid amplifier unit to a bypass system wherein the bypass must carry substantially 100 percent of the fluid flowing. In the use of the fluid amplifier in an ordinary bypass system, a certain small percent of the flowing fluid will not be bypassed due to the difference of impedance of the bypass circuit and the initial circuit through which the fluid was flowing. The lack of 100 percent switching is not detrimental in some applications, but in other applications is an intolerable condition.

In the air conditioning or temperature control field, failure to switch substantially 100 percent in the bypass may be a fatal defect. When it is desired to switch a heat exchange fluid through a bypass or through a heat exchange device, it becomes essential in heating and ventilating applications to provide substantially 100 percent diversion of the fluid in the bypass. It can be appreciated that if 100 percent diversion is not accomplished, that a slight amount of the heat transfer media still will flow in one of the circuits that is desired to be shut off. This tends to add heat to an area which has already been satisfied or tends to cool this area below a desired temperature, depending on the cycle of operation. It therefore becomes essential in certain applications that the switching function in a bypass system be substantially 100 percent or the system will not be suitable for commercial use. A system of the type considered will be described in detail in connection with the present application and the shortcomings of the failure to switch the system 100 percent will be specifically pointed out.

A means of switching a fluid amplifier device and obtaining substantially 100 percent diversion in a bypass system has been invented and is specifically disclosed in the present application. The novel teaching in the present application in no way impairs the desirable features of a fluid amplifier with no moving parts for use in control apparatus, but recognizes a simple means of balancing the fluid pressures in the amplifier in such a manner that it is impossible for any forward or backflow to occur in the coil when switched to bypass.

It is the primary object of the present invention to disclose a novel fluid diverting device capable of diverting the flow of a fluid through or around an impedance or load.

It is a further object of the present invention to disclose a novel fluid diverting device which has open flow passages and yet has no reverse flow in the device because of an internal balance of pressures.

Yet another object of the present invention is to disclose a fluid amplifier device with no moving parts that can cause flow through a load and yet switch substantially 100 percent of the fluid flow around the load without back circulation of the fluid.

And still a further object of the present invention is to disclose a temperature control or air conditioning system utilizing a fan coil wherein the heat exchange fluid can be switched through or around the coil with the only moving parts being in the thermostat or temperature responsive device.

These and other objects will become apparent when the detailed disclosure of the present invention is considered.

In the present drawings, there is disclosed in FIGURE 1 a temperature control or air conditioning system of the fan coil type;

In FIGURE 2 there is disclosed a fluid amplifier of a type that can be utilized with the system disclosed in FIGURE 1;

FIGURE 4 is a modified version of the fluid amplifier disclosed in FIGURE 2;

FIGURE 5 is a cross section of the fluid amplifier of FIGURE 4 taken along lines 5—5, and FIGURES 6 and 7 disclose two variations of fluid amplifier control inlets that can be utilized with either of the amplifiers disclosed in FIGURE 2 or 4.

Figure 1:
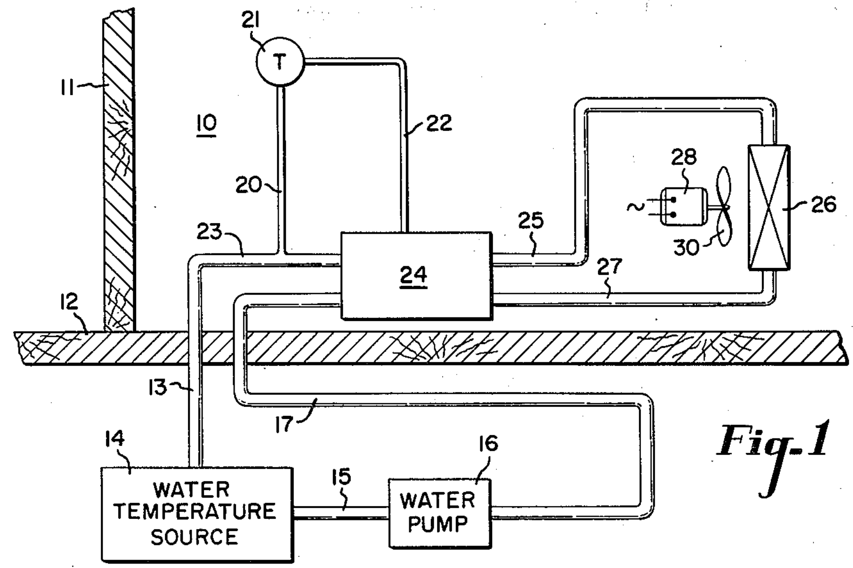

In FIGURE 1 there is disclosed a temperature control system or air conditioning system of the fan coil type. There is disclosed generally at 10 a room or space that is to be air conditioned. This space is typified by walls 11 and a floor 12 of conventional construction and has been shown partially in cutaway. Entering space 10 is a water pipe 13 that comes from a source of temperature conditioned water 14. The source 14 can be a hot water boiler for heating purposes or could be chilled water if the area or space 10 is to be cooled. Connected to source 14 by pipe 15 is a water pump 16 that circulates the temperature conditioned water in the novel control system. The return water from the space 10 is supplied by pipe 17 to pump 16 in a manner well known in the heating and ventilating art.

For simplicity in explaining the operation of the temperature control system in space 10, it will be assumed that the water source 14 is supplying hot water through pipe 13 to the control system. Pipe 13 branches to supply water in pipe 20 to a fluid operated thermostat 21 and this thermostat in turn supplies water to pipe 22. A section 23 of pipe 13 supplies the hot water from source 14 to a fluid control device generally shown at 24. The fluid control device 24 is shown in detail in the balance of the present application and only its broad function will be described at this point. The fluid control device 24 takes in hot water from pipe 23 and directs it to pipe 25, or to an internal bypass back to pipe 17, and then to the water pump 16. The water valved by thermostat 21 and supplied to pipe 22 is supplied to the control device 24 in order for the control device 24 to determine whether the hot water passing from pipe 23 will pass into pipe 25 or will be bypassed back to pipe 17.

If the hot water is passed through the control device 24 from pipe 23 to pipe 25, it then flows through a heat exchange coil 26 and back into a return pipe 27 that in turn passes into the fluid control device 24. Pipe 27 is connected internally of the control device 24 to pipe 17 thereby causing the water that has been passed through the coil 26 to pass back to the pump 16. An electrically driven motor 28 is schematically represented as operating a fan 30 that forces air through the heat exchange coil 26 to remove heat from the water passing through the system. It will thus be appreciated that whenever the control device 24 is directing the hot water from the source 14 directly through to pipe 25, and then through the heat exchange coil 26, that the space 10 is being heated.

Upon the space 10 reaching a satisfactory temperature, the thermostat 21 is satisfied and opens a fluid flow from pipe 20 through the thermostat 21 into the pipe 22. The flow into pipe 22 of control water switches the control device 24 to its internal bypass thereby diverting the water passing into pipe 23 through the control unit 24 and back into the pipe 17. This diversion removes flow from the heat exchange coil 26 and prevents the space 10 from increasing in temperature. At this point it is necessary to stress that the switching of the control device 24 must be substantially 100 per cent so that no flow passes through the heat exchange coil 26 when the thermostat 21 has been satisfied. The reason for this strict requirement is that during mild weather any slight leakage flow through the heat exchange coil 26 might be sufficient to raise the temperature of space 10 above the control temperature set on thermostat 21. It thus becomes apparent that if the control of fluid through the heat exchange coil 26 is not fully interrupted, that loss of control occurs and the space 10 could be overheated quite badly.

It will be appreciated that the system of FIGURE 1, which has been specifically discussed as operating on hot water, can be operated on chilled water for cooling of space 10 during hot weather. Again the requirement of 100 percent shutoff to the heat exchange coil is essential. It follows that in mild weather any leakage of cold water through the heat exchange coil 26 could well chill the space 10 below the desired temperature thereby making it uncomfortable for persons occupying this space.

At this point it is believed necessary to point out a few more of the practical considerations in installing an air conditioning system of the type disclosed in FIGURE 1. The size of the heat exchange coil 26 will vary depending on the size of plumbing, and the size of the space 10 that is to be conditioned. The impedance of the fluid flow circuit formed of pipes 25 and 27, along with the coil 26, varies depending on each individual installation. Further, it is essential that the fluid control device 24 be capable of being field installed without the need of modification or adjustment for each specific job or installation. This requirement has made it very difficult to design a conventional fluid amplifier for the fluid control device 24 since any change in the output impedance to the control device 24 would vary the internal characteristics of flow of the conventional fluid amplifier. The conventional fluid amplifier mentioned in the introduction to the present specification was not suitable for this type of use since all of the external variations in impedance changed the amplifier's ability to switch substantially 100 percent of the fluid flow through the bypass external to the unit. The present invention therefore is directed to a fluid flow control device 24 that has an internal construction that can be built or factory adjusted to work into a large variety of external flow impedances without affecting the ability of the fluid control device to switch substantially 100 percent of the fluid flow in the unit.

Figure 2:
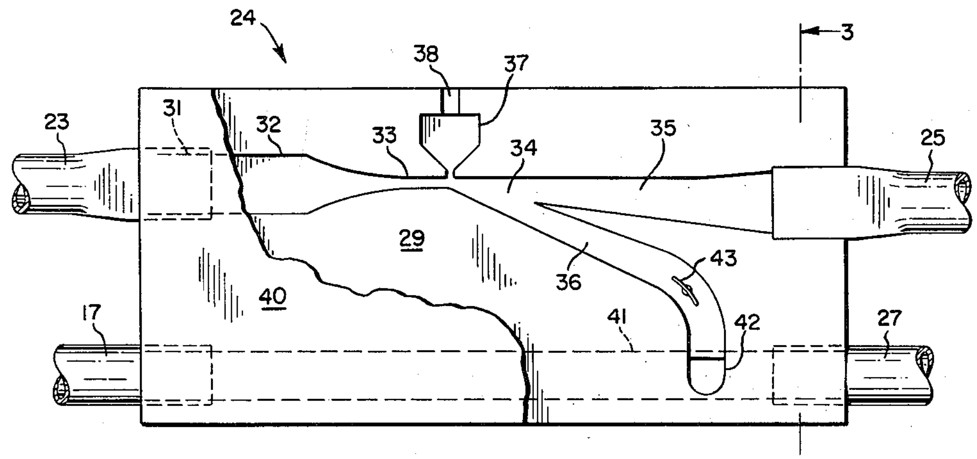

In FIGURE 2 there is disclosed a fluid flow control device 24 in a partially cut away view. The device 24 has inlet pipe 23 that is flattened in cross section at 31 to pass into a rectangular fluid inlet channel or means 32 that is cut out of any convenient solid body material 29. The fluid inlet means 32 is reduced in cross section to form a jet at 33 that then passes into a fluid utilization portion 34. The fluid utilization portion is a channel or passage of rectangular cross section that splits into two channels. The first channel or outlet means 35 passes into a flattened pipe 25. The fluid utilization portion 34 further is connected to a fluid bypass outlet means 36. A fluid control inlet means 37 in the form of a flat rectangular opening perpendicular to the side of the fluid utilization portion 24 is provided and is connected by opening 38 to the pipe 22. A cover or plate 40 of flat material is laminated to the top of the solid body 29 previously described, in any convenient manner. The plate 40 can be attached by cements, soldering, clamps or bolts (not shown). Any convenient constructional process can be used and will vary depending on the application of the unit. In the most common form, this unit would be of brass or a similar metal and would be bolted together in a fluid tight manner.

The body 29 has a drilled passage 41 extending through its entire length. Inserted into the left end of the passage 41 is pipe 17, while the pipe 27 is inserted in the right end. All of the joints involved are naturally fluid tight and provide a convenient fluid flow passage for the water contained in the described system.

Figure 3:
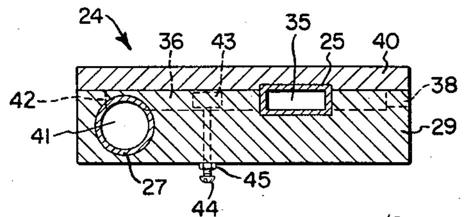
FIGURE 3 is a cross section of the fluid amplifier of FIGURE 2 along lines 3—3.

Completing the construction of the device of FIGURE 2 is an opening 42 which connects the bypass passage or channel 36 into the passage 41. Also contained in the bypass outlet means 36 is an adjustable impedance vane 43 that changes the impedance or flow characteristics of the bypass outlet means 36. In FIGURE 3 this impedance can be seen as vane 43 attached to a screw 44 that has a locking nut 45 that prevents a change of position of the vane 43. By rotating the screw 44, the vane 43 rotates and can be locked by nut 45 in any position thereby changing the impedance of the fluid bypass outlet means 36.

*Operation of FIGURE 2*

The operation of the control device 24 which is shown in FIGURE 2 will be referenced back to the over-all system disclosed in FIGURE 1. Fluid entering the pipe 23 is forced to flow through the reduced section 33 and due to the natural configuration of the fluid utilization portion 34 would flow directly into the outlet means 35, to the pipe 25, and then through the heat exchange coil 26, through pipe 27 and into the common flow passage 41. The flow circuit thus described is the natural or biased flow circuit, that is, the circuit which the fluid would follow if no switching signal or control signal is supplied through the thermostat 21 to pipe 22. If a flow is supplied through the thermostat 21 to pipe 22, a jet of fluid is caused to flow into the inlet 38 to the fluid control inlet means 37. The flow to the fluid control inlet means causes a jet of water to impinge on the side of the fluid flowing through the channel 33. This deflects the flow of fluid from the outlet means 35, into the fluid bypass outlet means 36, and through the hole 42 into the common flow passage 41. Under normal circumstances, a certain amount of leakage would try to flow between pipes 25 and 27 through the coil 26 when the control device is switched by the pressure being applied to pipe 22. This flow is due to a pressure difference between the outlet means 35 and the fluid return means formed by the common passage connecting pipe 27 with the passage 41. This pressure difference can be either positive or negative, causing the flow through the coil in either direction. It has been found that by adjusting the impedance of the fluid bypass outlet means 36, as by example with the vane 43, that it is possible to create the same pressure in the outlet means 35 as in the fluid return means 41. With the same fluid pressure existing in these two flow passages, there is no tendency for flow to occur in coil 26, since a pressure differential is required to move the fluid. In manufacture of a unit of the type disclosed in FIGURES 2 and 3, it has been found impractical to try to machine or manufacture the unit with perfect characteristics, and minor flow variances can be balanced out by the use of a variable impedance means or vane 43. Once the vane 43 has been adjusted and locked, the impedance placed between pipes 25 and 27 is of little or no significance as the pressure drop across these two pipes is zero. It therefore becomes apparent that a unit has been provided which is not sensitive to varying restrictions in the fan coil circuit which includes the pipe 25, the coil 26, and the pipe 27. Therefore a unit has been provided that is capable of switching substantially 100 percent of the fluid flow in the bypass. This configuration eliminates the problems of installation that would be normally inherent in installing this type of a unit in a control system.

In FIGURES 4 and 5, another configuration of fluid amplifier device utilizing the present invention is disclosed. Since the configuration of the device in FIGURES 4 and 5 is different than the arrangement of parts disclosed in the system of FIGURE 1, the numbers assigned in FIGURE 1 will not generally be adhered to even though many of the parts have similar functions.

An inlet pipe 50, which would be connected to pipe 23, is provided to cause fluid flow into the body 51 of the fluid control device generally shown at 52. The fluid flow passes through a passage 53 into a fluid utilization portion 54 and is controlled by a fluid control inlet means 55 that has an opening 56 that can be attached to pipe 22. The fluid utilization portion 54 opens into an outlet means 57 and a bypass outlet means 58. Again a flattened pipe 60 is provided at the end of the outlet means 57 and a flattened pipe 61 is supplied at the outlet of the common flow passage 62. A fluid return means 63 is connected to a flattened pipe 64 and a cover 65 is provided that can be clamped or sealed onto the base 51 in any convenient method as previously described. The pipe 60 is attached to pipe 25, while pipe 64 is attached to pipe 27 of the fan coil arrangement disclosed in FIGURE 1. The coil 26 is again shown along with the motor 28 and fan 30. An adjusting screw 66 is provided with a locking nut 67 and screw 66 operates against the bottom of a plate 68 that is attached at 69 to the wall of the fluid bypass outlet means 58. The screw 66 bends the plate 68 inward to vary the impedance of the bypass outlet means 58 and is then locked. Also, the passages 57 and 63 are shaped geometrically similar in order to maintain the same pressure drops at each over a wide variation in flow velocities.

*Operation of FIGURE 4*

Operation of the unit disclosed in FIGURES 4 and 5 is reversed to those of FIGURES 2 and 3. The fluid control device 52 is still a biased unit, but it is biased in an opposite direction to that disclosed in FIGURES 2 and 3. More specifically, water enters pipe 50 and passes through the channel 53, passing directly into the bypass outlet means 58 and then down through the common flow passage 62 into pipe 61 which is attached to pipe 17 of FIGURE 1. With this arrangement the water entering pipe 50 is directed straight through the unit and never passes through the coil 26 if a signal is not provided. If a control signal is supplied on pipe 22, a water pressure is in turn supplied to the fluid control inlet means 55 to deflect the flow of water in the fluid utilization portion 54 into the outlet means 57, which in turn carries the water through the coil 26. The water passing through coil 26 is returned by pipe 27 to the fluid return means 63 and to the common flow passage 62 where it passes back out to the water pump via pipe 17.

Once again the flow of the water through the control unit 52 is adjusted so that a pressure difference cannot exist between the outlet means 57 and the fluid return means 63 when fluid is allowed to flow in the fluid bypass means 58. Once the impedance of the fluid bypass outlet means 58 is adjusted so that no pressure differential exists across the pipes going to coil 26, the unit is in condition for installation in a control system. If the pressure difference between passages 57 and 63 is zero, there will be no flow in the coil 26 and a change of the impedance of this external circuit makes no difference in the flow characteristics of the fluid control device 52. As such, once again a flow control unit of a biased type is disclosed that has the characteristics needed for successful commercial operation in a fan coil system.

In FIGURE 6 there is disclosed a fluid amplifier configuration of fluid control inlet means of the type developed by the personnel previously mentioned at the Diamond Ordance Fuze Laboratory. The fluid control inlet means is made up of two inlets 70 and 71 which are on opposite sides of a fluid utilization portion 72. The fluid inlet means 73 would supply fluid to the utilization portion 72 and the fluid would thus flow in either passage 74 or 75. In the configuration disclosed in FIGURE 6, there is no bias placed on the unit due to its symmetrical arrangement and without a signal supplied to either the control inlets 70 or 71, the fluid entering the inlet means 73 will go down the channel which gets the original surge of fluid. If a signal is supplied to the control passage 70, the entire fluid flow entering the inlet means 73 switches to the outlet channel 75 and remains in channel 75 due to the pressure differences that occur between the surface of the fluid flow and the wall 76 of the device.

The fluid control inlet means described in FIGURE 6 can be pulsed by the temporary application of pressure to either inlet 70 or inlet 71 and the fluid stream passing into the inlet means 73 will be switched into the outlets 74 or 75. The switching of the unit remains fixed until a new control pulse is placed on the opposite fluid control inlet means thereby forcing the fluid to move over to the other outlet means. This fluid utilization portion could be adapted for use in either of the control devices disclosed in FIGURES 2 or 4 and would require a slight modification in the type of thermostat used in the system. In FIGURE 7 there is disclosed an induction fluid amplifier utilization portion of a type disclosed in a co-pending application. The co-pending application is assigned to the assignee of the present invention and the inventor is R. J. Reilly. This application was filed on November 16, 1960, and has been assigned the serial number 69,645 which issued April 24, 1962 as Patent 3,030,979. The induction fluid amplifier operates on an entirely different principle than the amplifiers previously described and will be briefly described herein. The induction fluid amplifier utilizes the principle of attracting a fluid flow by a second fluid that is flowing due to the viscous forces that exist between the two flowing fluids. A fluid inlet means 80 is supplied with a fluid such as water and passes into a fluid utilization portion 81 and exits through an outlet means 82. The configuration shown is a biased configuration, that is the fluid flowing into the inlet 80 will naturally flow out of the outlet means 82 unless a continuous control signal is supplied to the fluid utilization portion 81. If a fluid is supplied at inlet 83 to the fluid control inlet means 84, the fluid passes into a control passage 85 and flows along the wall 86 of the outlet passage 87. The flow of fluid in passage 85 is directed down the outlet passage 87 and in no way flows in the outlet passage 82. The flowing of the control fluid in passage 85 and in outlet 87 attracts the fluid flowing in the fluid utilization portion 81 so that the fluid entering the inlet means 80 switches and flows out of the outlet means 87. The fluid utilization portion of FIGURE 7 can be readily applied to the devices of FIGURE 2 or 4 and has been shown as an example of one of the many modifications that is possible in the present application without changing the scope of the present invention.

The applicant in the present application has shown a number of embodiments and variations that can be used in connection with the novel fluid flow control device. These various modifications have been primarily shown due to the state of the present art and in no way form limitations on the novelty claimed. They have been disclosed in order to more fully explain various modes of operation that can be accomplished and show a few of the variations of configurations in the control device which would in no way affect the point of novelty. As such the applicant wishes to be limited in no way to the specific disclosure contained, but wishes to be limited only in scope by the appended claims.

The embodiments of the invention in which an exclusive property or privilege is claimed are defined as follows:

1. A method of operating a fluid filled fluid amplifier to control the fluid through or around a fluid filled load, including; supplying a fluid under pressure to a fluid amplifier inlet; controlling the inlet flow to direct the flow through a fluid amplifier outlet to the load, or a bypass outlet to bypass the load; and adjusting the fluid impedance of the bypass outlet to create a zero pressure drop across the load when the fluid flows through the bypass outlet to thereby prevent any fluid flow through the load.

2. A method of operating a fluid filled fluid amplifier to control the fluid through or around a fluid filled load, including; supplying a fluid under pressure to a fluid amplifier inlet; applying a fluid control signal to the inlet flow to direct the total flow through a fluid amplifier outlet to the load, or a bypass outlet to bypass the load; and adjusting the fluid impedance of the bypass outlet to create a zero pressure drop across the load when the fluid flows through the bypass outlet to thereby prevent any fluid flow through the load.

3. A method of operating a fluid filled fluid amplifier to control the fluid through or around a fluid filled load, including; supplying a fluid under pressure to a fluid amplifier inlet and a load; applying a fluid control signal to the inlet flow to direct the total flow through a fluid amplifier bypass outlet to bypass the load; and adjusting the fluid impedance of the bypass outlet to create a zero pressure drop across the load when the control signal directs the fluid through the bypass outlet to thereby prevent any fluid flow through the load.

4. A method of operating a fluid filled fluid amplifier to control the fluid through or around a fluid filled load, including; supplying a fluid under pressure to a fluid amplifier inlet and a bypass outlet; applying a fluid control signal to the inlet flow to direct the total flow through the load; and adjusting the fluid impedance of the bypass outlet to create a zero pressure drop across the load when the fluid flows through the bypass outlet to thereby prevent any fluid flow through the load.

5. A fluid amplifier control device, comprising: fluid amplifier means including fluid inlet means connected to a source of fluid under pressure; said amplifier means further including a fluid utilization portion having fluid outlet means and fluid return means; fluid bypass outlet means including flow impedance means connected between said fluid inlet means and said fluid return means by a common flow passage; and fluid control inlet means adjacent said fluid inlet means and said control means connected to a source of fluid to switch the inlet fluid flow between said utilization outlet means and said bypass outlet means; said impedance means being of such a value that when the fluid flow is in said bypass outlet means that the pressure in said utilization outlet means and said return means is the same thereby preventing fluid flow in said utilization portion.

6. A fluid amplifier control device, comprising: fluid amplifier means including fluid inlet means connected to a source of fluid under pressure; said amplifier means further including a fluid utilization portion having fluid outlet means and fluid return means; fluid bypass outlet means including flow impedance means connected between said fluid inlet means and said fluid return means by a common flow passage; and a fluid control inlet adjacent one side of said fluid inlet means and said fluid control inlet connected to said source of fluid to switch the inlet fluid flow between said utilization outlet means and said bypass outlet means; said impedance means being of such a value that when the fluid flow is in said bypass outlet means that the pressure in said utilization outlet means and said return means is the same thereby preventing fluid flow in said utilization portion.

7. A fluid amplifier control device, comprising: a fluid amplifier including a fluid inlet connected to a source of fluid under pressure; said amplifier further including a fluid utilization portion having a fluid outlet in line with said inlet to normally receive a fluid flow; said fluid utlization portion further including a fluid return; fluid bypass means including flow impedance means connected between said fluid inlet and said fluid return by a common flow passage; and a fluid control inlet adjacent one side of said fluid inlet and said control inlet being connected to said source of fluid to switch the inlet fluid flow from said utilization outlet into said bypass means; said impedance means being of such a value that when the fluid flow is in said bypass means that the pressure in said utilization outlet and said return is the same thereby preventing fluid flow in said utilization portion.

8. A fluid amplifier control device, comprising: a fluid amplifier including a fluid inlet connected to a source of fluid under pressure; said amplifier further including a fluid utilization portion having a fluid outlet and a fluid return; fluid bypass means including flow impedance means connected in line with said inlet and between said fluid inlet and said fluid return by a common flow passage; and a fluid control inlet adjacent one side of said fluid inlet and said control inlet being connected to said source of fluid to switch the inlet fluid flow between said bypass means and said utilization outlet; said impedance means being of such a value that when the fluid flow is in said bypass means that the pressure in said utilization outlet and said return is the same thereby preventing fluid flow in said utilization portion.

9. A temperature control system, comprising: fluid amplifier means including fluid inlet means connected to a source of heat exchange fluid under pressure; said amplifier means further including a fluid utilization portion having fluid outlet means and fluid return means with the last said means connected together by heat exchange load means; fluid bypass outlet means including flow impedance means connected between said fluid inlet means and said fluid return means by a common flow passage; fluid control inlet means adjacent said fluid inlet means; and temperature responsive means connected to said fluid control inlet means and to a source of fluid to switch the inlet fluid flow between said utilization outlet means and said bypass outlet means in response to said temperature responsive means; said impedance means being of such a value that when the fluid flow is in said bypass outlet means that the pressure in said utilization outlet means and said return means is the same thereby preventing fluid flow in said heat exchange load means.

10. A temperature control system, comprising: fluid amplifier means including fluid inlet means connected to a source of heat exchange fluid under pressure; said amplifier means further including a fluid utilization portion having fluid outlet means and fluid return means with the last two said means connected together by heat exchanger means; fluid bypass outlet means including flow impedance means connected between said fluid inlet means and said fluid return means by a common flow passage;

fluid control inlet means adjacent said fluid inlet means; and ambient temperature responsive means connected between said fluid control inlet means and said source of fluid to switch the inlet fluid flow between said utilization outlet means and said bypass outlet means in response to an ambient temperature; said impedance means being of such a value that when the fluid flow is in said bypass outlet means that the pressure in said utilization outlet means and said return means is the same thereby preventing fluid flow in said heat exchanger means.

References Cited in the file of this patent

UNITED STATES PATENTS

| | | |
|---|---|---|
| 1,927,215 | Peebles | Sept. 19, 1933 |
| 2,517,812 | Wade | Aug. 8, 1950 |
| 2,889,856 | Magnuson | June 9, 1959 |
| 3,001,539 | Hurvitz | Sept. 26, 1961 |
| 3,016,063 | Hausman | Jan. 9, 1962 |
| 3,016,066 | Warren | Jan. 9, 1962 |
| 3,030,979 | Reilly | Apr. 24, 1962 |